Figure 1:
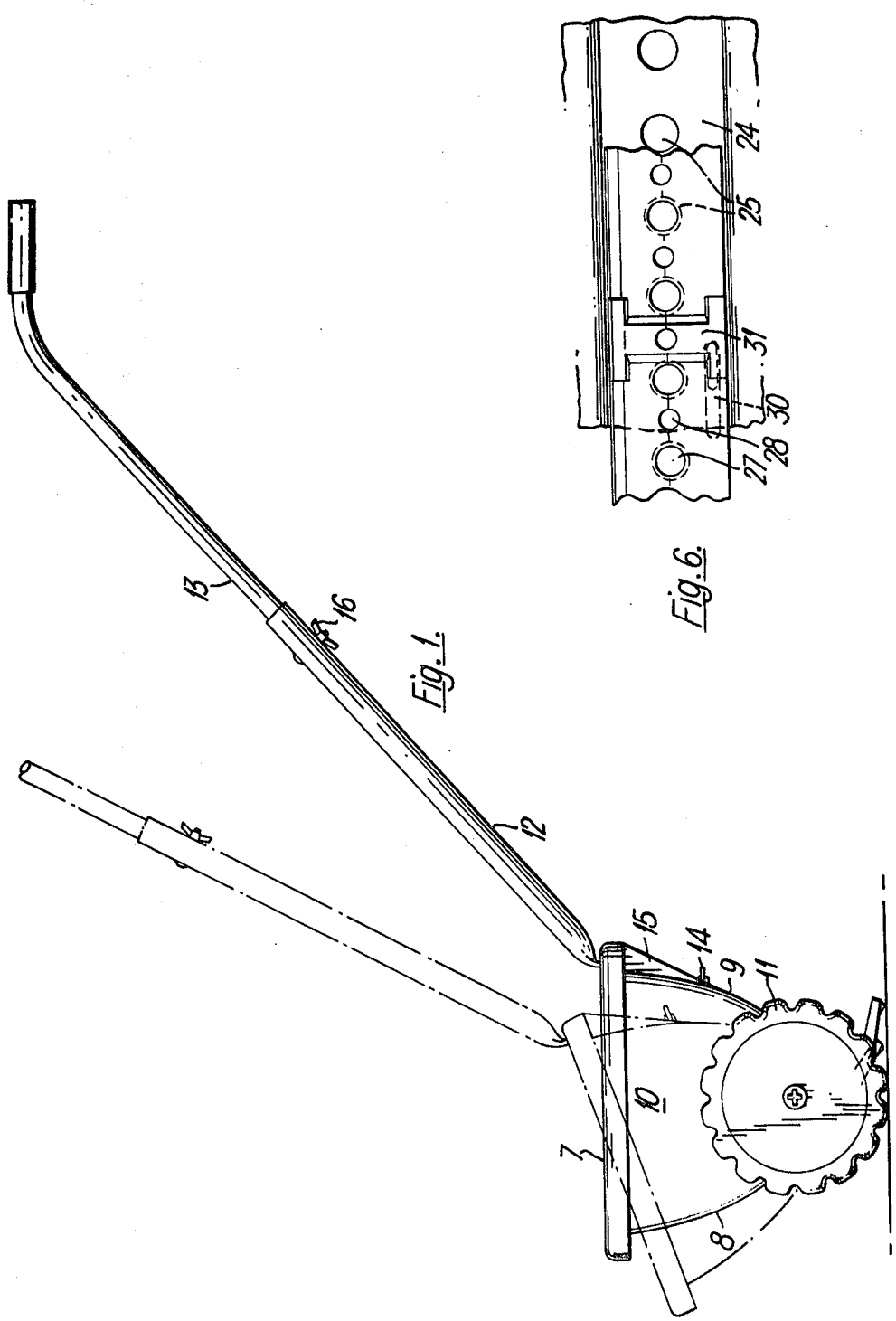

United States Patent

[11] 3,580,426

| [72] | Inventor | Peter R. J. Manning<br>Southfields, England |
|---|---|---|
| [21] | Appl. No. | 842,548 |
| [22] | Filed | July 17, 1969 |
| [45] | Patented | May 25, 1971 |
| [73] | Assignee | Tri-Ang Toys Limited<br>London, England |
| [32] | Priority | July 18, 1969 |
| [33] | | Great Britain |
| [31] | | 34284/68 |

[54] FERTILIZER DISTRIBUTOR
7 Claims, 6 Drawing Figs.

[52] U.S. Cl. .................................................. 222/177
[51] Int. Cl. .................................................. A01c 15/00
[50] Field of Search .......................................... 222/177,
501; 111/25, 27, 33

[56] References Cited
UNITED STATES PATENTS
3,451,595   6/1969   Dexter .......................... 222/177
1,965,483   7/1934   Woods .......................... 222/177X

*Primary Examiner*—Samuel F. Coleman
*Assistant Examiner*—James M. Slattery
*Attorney*—Holcombe, Wetherill and Brisebois ABSTRACT: A garden fertilizer distributor comprises a hopper having a bottom outlet and supported on a pair of wheels mounted one on each end of a roller. The roller is formed with longitudinal pockets which deliver metered quantities of the fertilizer to the outlet as the roller rotates with the wheels in use. A closure plate is pivoted on the hopper and is spring loaded to a position in which it closes the hopper outlet. Two marker fingers are rigid with the closure plate and engage the ground when the hopper is tilted to a position of use and thereby swing the closure plate about its pivot away from the hopper outlet to permit delivery of fertilizer through the outlet.

FERTILIZER DISTRIBUTOR

This invention relates to fertilizer distributors such as are used for applying granulated artificial fertilizer to lawns. Because these distributors are likely to be used by ordinary house-holders it is desirable that they should be as simple and as easy to use as possible.

In accordance with the present invention a distributor comprises a hopper having a bottom outlet and supported on a pair of wheels, and a closure plate pivoted on the hopper and movable from a position in which it closes the bottom outlet to a position in which it is clear of the outlet, the plate having at least one marker rigidly attached which is arranged both to run along the ground in use to indicate the path taken by the distributor and to move the cover plate into the position in which the outlet is open upon tilting of the hopper about the axis of the wheels into a position of use.

Preferably the hopper outlet extends substantially between the two wheels and there are two markers one aligned with each end of the outlet.

It is possible for the closure plate to act as a scatter plate to even out the flow of material issuing from the slot but it is found more convenient to provide a separate scatter plate rigid with the closure plate.

A handle preferably projects upwards from the hopper so that the distributor can conveniently be pushed along. The handle also serves to tilt the distributor into the position of use in which the markers move the plate to the position in which the outlet is open. In order that the bottom outlet should be closed automatically when the hopper is in a vertical position the plate is preferably spring-loaded to the position in which the outlet is closed.

The bottom outlet may be provided with a selector plate which allows a controlled amount of fertilizer to pass and the controlled amount may be adjustable, for example by moving the plate to another position or using a pair of plates formed with openings, one of the plates being movable so that the openings are more or less in register with one another.

Figure 2:
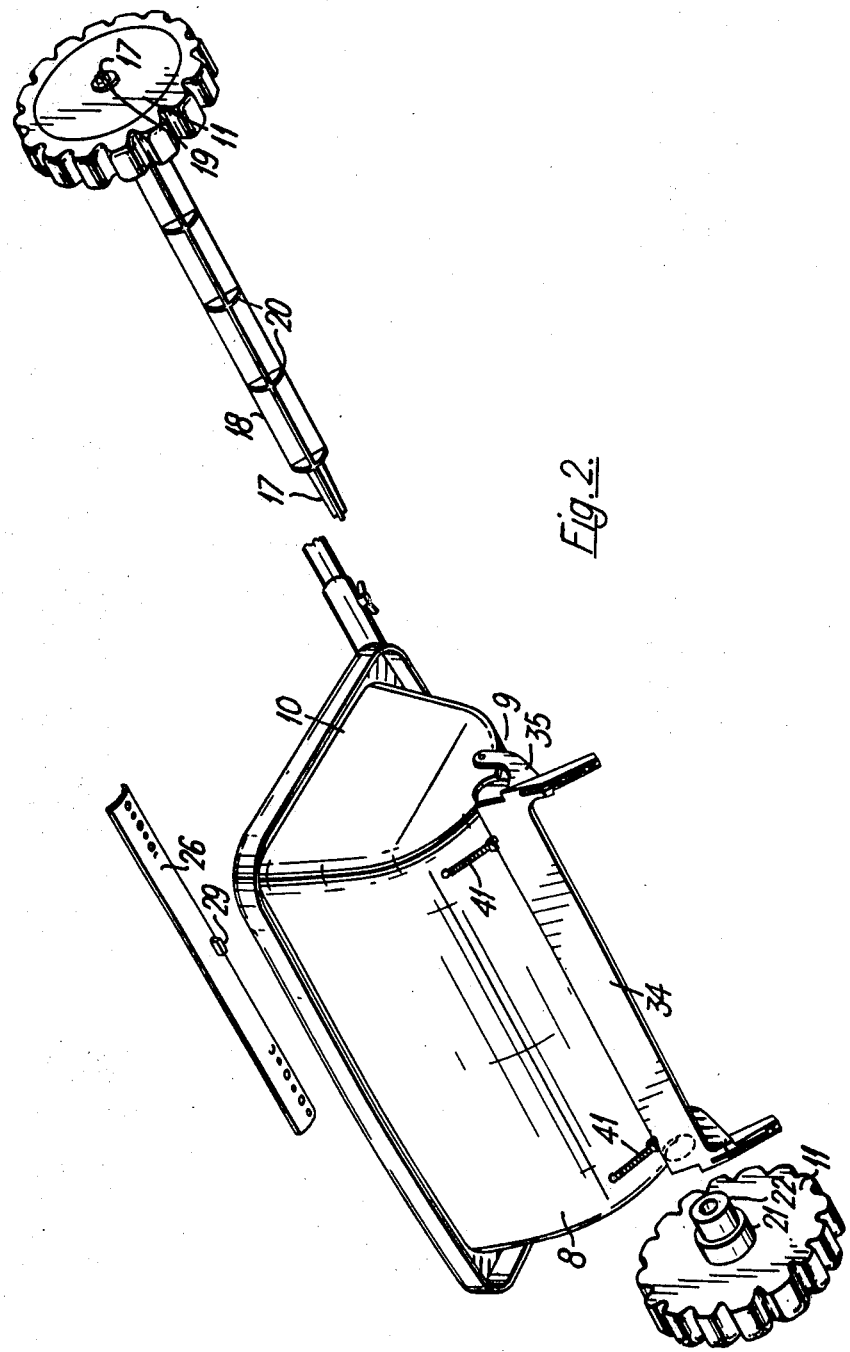
Figure 3:
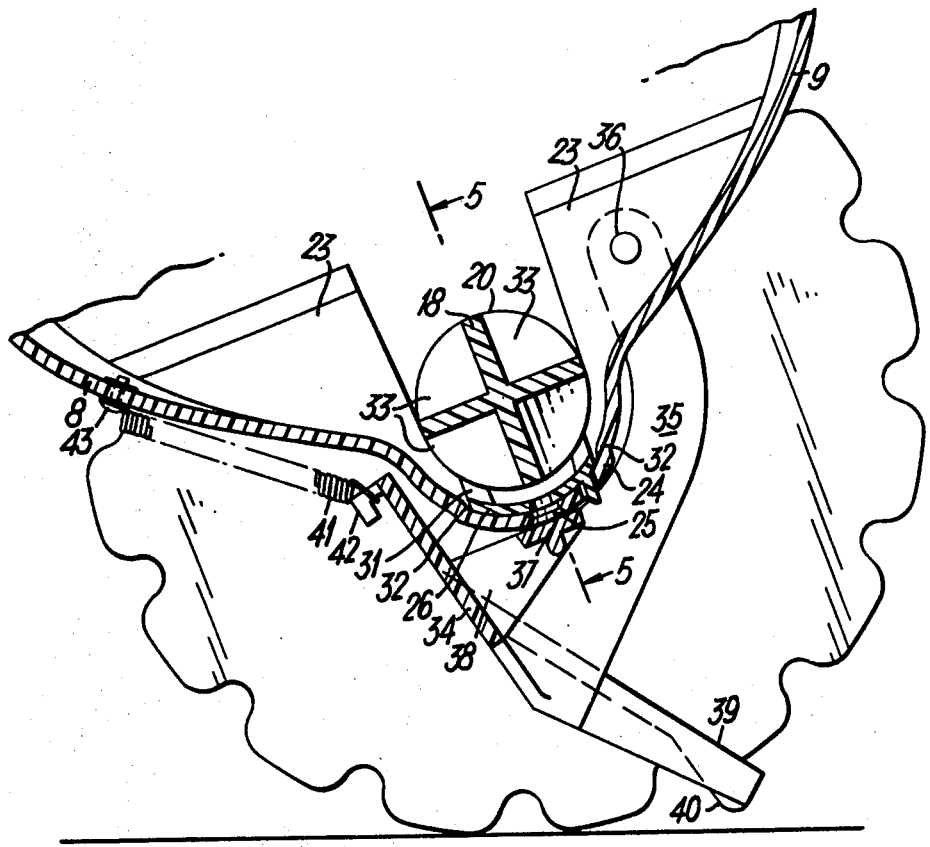
Figure 5:
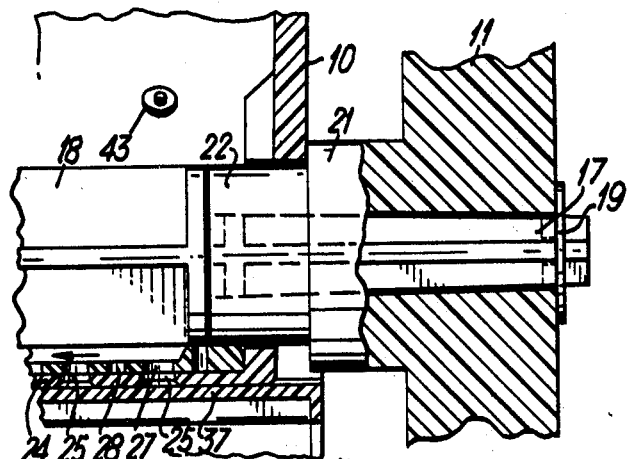
Figure 4:
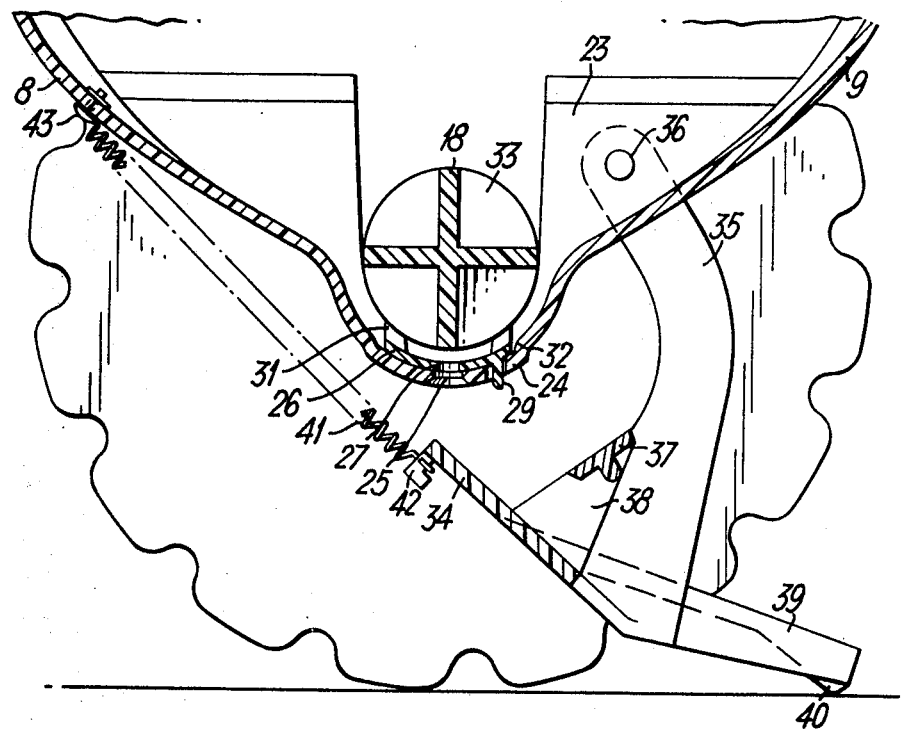

One example of a distributor constructed in accordance with the invention is illustrated in the accompanying drawings, in which:

FIG. 1 is a side elevation;
FIG. 2 is an exploded perspective view;
FIG. 3 is a sectional elevation;
FIG. 4 is a similar view to FIG. 3 but with certain parts of the distributor occupying a different position;
FIG. 5 is a section taken on the line 5-5 in FIG. 3; and,
FIG. 6 illustrates a detail of the distributor in plan.

As shown in FIG. 1, the distributor has a hopper 7 having front and rear walls 8 and 9 which curve down towards one another, and parallel end walls 10. The distributor is supported on a pair of wheels 11 and is provided with a handle comprising a lower section 12 and an upper section 13. The lower section 12 is tubular having a flattened and bent lower end, which is fixed to the rear wall 9 of the hopper by a pair of bolts and wing nuts of which one 14 is visible in FIG. 1. The rear wall 9 of the hopper is strengthened in the region of the handle section 12 by a pair of triangular fillets 15, one on either side of the handle. The upper section 13 of the handle telescopes inside the lower section 12 and the two sections are secured together by a wing nut and bolt 16 which passes through aligned holes in the two sections.

The wheels 11 are carried on tapered ends 17 of a roller 18 where they are held by spring washers 19. The tapered ends 17 are cruciform in cross section and penetrate through holes of corresponding cross section in the outer surfaces of the wheels. In this way the roller is constrained to rotate with the wheels. The roller 18 itself is also of cruciform cross section and has five circular stiffening webs 20 along its length. The wheel 19 are formed with inwardly projecting hubs each having a large diameter section 21, which spaces the corresponding wheel 11 away from the sidewall 10 of the hopper, and a smaller diameter section 22 which is received in a hole in the corresponding end wall 10 of the hopper. Each end wall has a thickened portion 23 on either side of the roller to strengthen the end wall in this region.

The front and back walls 8 and 9 of the hopper merge into a bottom section 24 which is cylindrically curved about the axis of the roller 18. The bottom section 24 is formed with a row of holes 25 which form an outlet from the hopper. A selector plate 26 lies on top of the bottom section 24 and is formed with a row of holes of two different diameters, the larger holes 37 alternating with the smaller holes 28. The selector plate 26 can be slid axially, by means of a finger piece 29 which projects through a slot 30 in the bottom section 24, from the position shown in FIG. 6, in which the larger holes 27 register with the holes 25, to a position in which the smaller holes register with the holes 25. The selector plate has five equally spaced upward projections 31 which rub against the roller 18 and cooperate with two shoulders 32 in locating the selector plate.

As the distributor is pushed along by its handle the wheels cause the roller to turn. The cruciform cross section of the roller provides four pockets 33 which cooperate with the bottom section 24 in delivering metered quantities of fertilizer granules, carried in the hopper in use, to the holes 25. The amount of fertilizer delivered depends to some extent on whether the larger holes 27 or the smaller holes 28 are in register with the holes 25.

A scatter plate 34 is formed with a pair of integral arms 35 which are pivoted at 36 one on each of the end walls 10 of the hopper. The granulated fertilizer falls from the holes 25 and then trickles over the scatter plate 34 which distributes the granules in the axial direction of the roller so that they are scattered evenly on the ground rather than dropping directly to the ground from the holes 25 and forming a number of lines one beneath each of the holes 25.

A closure plate 37 extends between the two arms 35 and is braced by three intermediate brackets 38. Two members in the form of fingers 39 project backwards and downwards from the scatter plate 34, one adjacent to each of the arms 35. Each finger has a downwardly projecting blunt point 40.

Two springs 41 extend from hooks 42 on the scatter plate 34 to the front wall 8 where they are secured by rivets 43. The effect of the springs is to urge the scatter plate together with the closure plate 37 and the fingers 39 towards the position shown in FIG. 3 and in full lines in FIG. 1. In this position the closure plate 37 blocks the holes 25 and prevents any of the fertilizer granules from the leaving the hopper. In this position the hopper can be filled and the distributor transported to its place of intended use without waste of the fertilizer. To use the distributor, the handle is rocked downwards about the axis of the wheels to the position shown in full lines in FIG. 1 and illustrated in FIG. 4. The points 40 of the fingers 49 bear against the ground and rock the scatter plate 34 together with the closure plate 37 about the pivots 36 so that the closure plate is clear of the holes 25 and the scatter plate 34 is inclined at about 45° to the horizontal with its upper edge beneath the holes 25. In this position fertilizer granules are free to fall through the holes 25, and on to the scatter plate as the distributor is pushed along. The tips 40 of the fingers 39 drag along the ground firmly enough to leave a mark which indicates to the user the limits of the strip of ground on which fertilizer has been deposited.

I claim:

1. A distributor comprising a hopper, outlet means disposed at the bottom of said hopper, two coaxial wheels operably supporting said hopper, closure means pivoted to said hopper and pivotally movable between first and second positions, said closure means being adapted when in said first position to close said outlet from said hopper to prevent passage of material therethrough and being adapted in said second position to be clear of said outlet to permit passage of material therethrough, and marker means rigid with said closure means and adapted to engage the ground upon tilting of said hopper about said wheel axis into a position of use and thereby to move said closure plate from said first position to said second position.

2. A distributor according to claim 1 wherein said hopper outlet means extends substantially between said two wheels and said marker means comprises two marker fingers, one aligned with each end of said outlet means.

3. A distributor according to claim 2 further comprising a scatter plate rigid with said closure means and disposed beneath said hopper outlet means when said closure means occupies said second position whereby said scatter plate evens out the flow of material issuing from said outlet means.

4. A distributor according to claim 1 further comprising a handle projecting upwards from said hopper and adapted to serve both for pushing said distributor forwardly and for tilting said distributor into said position of use to move said closure means into said second position.

5. A distributor according to claim 4 further comprising spring means adapted to bias said closure means towards said first position.

6. A distributor according to claim 1, wherein said hopper outlet means comprises a row of holes and said distributor further comprises a selector plate provided with two series of holes, the holes of one of said series being of larger diameter than those of the other, and said selector plate being disposed at said hopper outlet and movable between first and second positions, in said first position said series of larger holes being in register with said holes constituting said hopper outlet and in said second position said series of smaller holes being in register with said holes constituting said hopper outlet.

7. A distributor according to claim 1 further comprising a roller, said wheels being rigidly mounted one on each end of said roller and said roller being disposed within said hopper above said hopper outlet, and a plurality of longitudinally extending pockets spaced around the periphery of said roller and adapted to deliver to said outlet metered quantities of material carried in said hopper.

UNITED STATES PATENT OFFICE
CERTIFICATE OF CORRECTION

Patent No. 3,580,426      Dated May 25, 1971

Inventor(s) PETER R. J. MANNING

It is certified that error appears in the above-identified patent and that said Letters Patent are hereby corrected as shown below:

In the heading insert:

[73] Assignee    TRI-ANG PEDIGREE LIMITED
                   London, England
[32] Priority     July 18, 1968

Signed and sealed this 14th day of September 1971.

(SEAL)
Attest:

EDWARD M. FLETCHER, JR.        ROBERT GOTTSCHALK
Attesting Officer               Acting Commissioner of Patents